United States Patent

Natarajan et al.

[11] Patent Number: 5,344,892
[45] Date of Patent: Sep. 6, 1994

[54] POLYESTER COMPOSITIONS WITH IMPROVED CRYSTALLIZATION RATE

[75] Inventors: Kavilipalayam M. Natarajan, North Brunswick; Shilain D. Wu, Robbinsville, both of N.J.

[73] Assignee: Enichem S.p.A., Milan, Italy

[21] Appl. No.: 85,043

[22] Filed: Jul. 2, 1993

[51] Int. Cl.$^5$ .................. C08L 71/12; C08L 67/02
[52] U.S. Cl. .................... 525/397; 525/905
[58] Field of Search ................ 525/397, 905

[56] References Cited

U.S. PATENT DOCUMENTS

| | | |
|---|---|---|
| 2,465,319 | 3/1949 | Whinfield et al. |
| 3,047,539 | 7/1962 | Pengilly et al. |
| 3,352,904 | 11/1967 | Bicking et al. |
| 3,575,931 | 4/1971 | Sherman et al. |
| 4,238,673 | 12/1980 | Layden et al. ............ 250/202 |
| 4,305,864 | 12/1981 | Griffin et al. ............ 525/437 |
| 4,322,335 | 3/1982 | Nield et al. ............ 523/522 |
| 4,368,288 | 1/1983 | Nield et al. ............ 524/539 |
| 4,390,493 | 6/1983 | Yasui et al. ............ 264/328.16 |
| 4,393,178 | 7/1983 | Legras et al. ............ 525/437 |
| 4,401,792 | 8/1983 | Axelrod et al. ............ 525/175 |
| 4,425,470 | 1/1984 | Garcia et al. ............ 525/444 |
| 4,551,507 | 11/1985 | Haylock et al. ............ 525/437 |
| 4,940,753 | 7/1990 | Okada et al. ............ 525/68 |
| 5,223,563 | 6/1993 | Axelrod ............ 524/401 |

FOREIGN PATENT DOCUMENTS 0021648 1/1981 European Pat. Off.
0351732 1/1990 European Pat. Off.

*Primary Examiner*—James J. Seidleck
*Assistant Examiner*—Thomas Hamilton, III
*Attorney, Agent, or Firm*—Oblon, Spivak, McClelland, Maier & Neustadt

[57] ABSTRACT

A molding composition comprising a thermoplastic polyester in an alkali metal salt of polyphenylene ether as a nucleating agent.

14 Claims, No Drawings

POLYESTER COMPOSITIONS WITH IMPROVED CRYSTALLIZATION RATE

BACKGROUND OF THE INVENTION

1. Field of the Invention

The present invention relates to polyester molding compositions which exhibit improved rates of crystallization. In particular, the invention relates to molding compositions of polyethylene terephthalate having an increased crystallization rate even at low mold temperatures, a good combination of mechanical and thermal properties, and an improved hydrolytic stability.

2. Description of the Background

Polyethylene terephthalate (PET) is used extensively in the manufacture of fibers, films and containers (bottles) because of its low cost, good physical properties and good electrical properties. However, PET cannot be employed in injection molding processes because the crystallization rate of the PET is slow and, as a consequence, the polymer does not crystallize completely in the mold. At very low mold temperatures, i.e., about 27° F., the PET can be injection molded into various shaped articles which have a completely amorphous structure. However, the dimensions of such molded parts or objects will change when the objects are heat aged at temperatures above the glass transition temperature (Tg) of the PET, which results in reduced dimensional stability of the molded parts. When unmodified PET is molded at mold temperatures above the Tg of the polymer, the high viscosity of the polymer does not permit the polymer to crystallize to a sufficient extent. Rather, in such cases, the surface of the polyester in the mold sticks to the mold surfaces, thus making it difficult to eject the molded article from the mold. In fact, in such molding very long cycle times and high mold temperatures are required in order to successfully process unmodified PET in the injection molding process.

It is known that the crystallization rate and crystallization temperature of PET can be increased by the addition of a nucleating agent to a molding composition. Several nucleating agents have the characteristic of promoting rapid crystallization under conditions of rapid cooling from the melt. An acceptable nucleating agent should be highly effective at low concentration in promoting crystallization, and further should be readily dispersable so that rapid and uniform crystallization of the polymer from the melt is possible.

Commonly employed nucleating agents for PET are the alkali and alkaline earth metal salts of organic acids. U.S. Pat. No. 3,352,904 discloses the sodium and potassium salts of carboxylic acids, as well as the salts of organic polymers containing pendant acidic groups, including carboxylic acid groups, as nucleating agents for PET. U.S. Pat. Nos. 4,322,335; 4,368,288; 4,305,864; 4,390,493; 4,393,178 and EP 21,648 and 351,732 all disclose the use of ionizable metal salts of aromatic ring containing compounds, wherein the aromatic rings are substituted by acid groups which are carboxylic acid, sulfinic acid, phosphonic acid, phosphinic acid and phenolic groups.

U.S. Pat. No. 3,575,931 shows metal salts of carboxylic acids as nucleating agents for PET. U.S. Pat. No. 4,401,792 discloses alkali metal salts of polyethylene ionomers and benzoic acid as nucleating agents for PET. U.S. Pat. No. 4,425,470 discloses alkali metal salts of ethylene terephthalate oligomers as nucleating agents for PET. U.S. Pat. No. 4,551,507 shows alkali and alkaline earth metal carboxylate salts of tertiary and quaternary amines as PET nucleating agents.

The crystallized polyesters obtained by the art known processes do not show sufficient heat resistance and hydrolytic stability in many applications where the molded polymers are exposed to humid conditions and high heat. Still another drawback of the nucleated polyester compositions known to the art is that the polymer during its processing suffers a decrease in weight average molecular weight, mostly because of the degradation phenomenon caused by ionic nucleants. This effect is also responsible for the observed decrease in the mechanical properties of the polyesters. Further, small molecular weight acids remaining in the polymer after nucleation which are derived from the acid salts cause acid degradation of the PET. A need therefore continues to exist for multiple polyester compositions having enhanced crystallization rates along with good hydrolytic stability and mechanical properties.

SUMMARY OF THE INVENTION

Accordingly, one object of the present invention is to provide a polyester molding composition which exhibits enhanced crystallization rates and provides molded objects of good hydrolytic stability and mechanical properties.

Another object of the present invention is to provide a method for increasing the crystallization rate and crystallization temperature of thermoplastic polyesters, along with providing a molded polyester product of improved physical properties including heat resistance, flexural modulus and hydrolytic stability.

Briefly, these objects and other objects of the present invention as hereinafter will become more readily apparent can be attained in a thermoplastic polyester molding composition comprising a thermoplastic polyester and an alkali metal salt of polyphenylene ether.

DETAILED DESCRIPTION OF THE PREFERRED EMBODIMENTS

The moldable polyester composition of the present invention is endowed with high crystallization rate and crystallization temperature and is normally constituted of 10–90 percent by weight of a crystallizable thermoplastic polyester and 10–90 percent by weight of a polyphenylene ether having at least 10 percent and up to 100 percent of the molecular ends of the molecules salified with an alkali ion. Preferably, from 30–60 percent by weight of the crystallizable thermoplastic polyester is combined with 30–60 percent by weight of polyphenylene ether salt, most preferably 30–50 percent by weight of the thermoplastic crystallizable polyester with 30–50 percent by weight of the polyphenylene ether salt. A molded polyester object prepared from the composition of the present invention exhibits good physical properties including heat resistance, flexural modulus and hydrolytic stability.

Suitable thermoplastic polyesters which can be employed to prepare the moldable composition of the present invention include crystallizable linear and branched thermoplastic polymers obtained by the condensation of substantially dicarboxylic acids, or ester derivatives thereof, and diols. Suitable dicarboxylic acid components of the more preferred polyesters contain at least 20 percent aromatic dicarboxylic acid selected from the group consisting of terephthalic acid, isophthalic acid, naphthalene dicarboxylic acid, diphenyl ether dicarboxylic acid, diphenyl dicarboxylic acid, diphenyl sulfone dicarboxylic acid, diphenoxyethane dicarboxylic acid, and the like. The non-aromatic component of the dicarboxylic acid is succinic acid, adipic acid, sebacic acid or the like.

The diol component of the preferred polyesters can be selected from aliphatic diols containing from 2–10 carbon atoms and include the likes of ethylene glycol, diethylene glycol, trimethylene glycol and tetramethylene glycol. The term diol as used in the present invention also includes mixtures of the above diols among themselves or with up to 10 percent by weight, based on the diol, of a polyol having a functionality higher than 2 including triol compounds.

Even more preferred polyesters are poly (alkylene terephthalates) which have structural units of the formula:

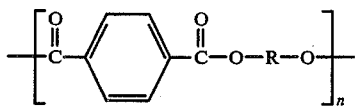

wherein n is an integer ranging from 2 to 6. The most preferred polyester is polyethylene terephthalate.

Suitable thermoplastic polyesters are characterized by having intrinsic viscosities ranging from about 0.4–1.5 g/dL, preferably between 0.6 and 1.1 g/dL. Intrinsic viscosity is obtained by extrapolation of viscosity values to zero concentration of solutions of the polyester in 60/40 V/V 1,1,2,2-tetrachloroethane/phenol at 25° C. Essentially, any thermoplastic polyester acceptable for use in molding compositions can be employed in the present invention. Such polyesters are disclosed in U.S. Pat. No. 2,465,319 and may be prepared by the techniques disclosed therein and by U.S. Pat. No. 3,047,539, each of which U.S. patents is incorporated by reference herein.

The polyphenylene ether (polyphenylene oxide), from which the alkali metal salt ingredient of the present composition is prepared, is a component which comprises a plurality of units having the formula:

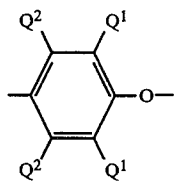

wherein, in each of the structural units, each $Q'$ is independently, halogen, primary or secondary, $C_{1-7}$ alkyl, phenyl, haloalkyl, aminoalkyl, hydrocarbonoxy or halohydrocarbonoxy, wherein at least two carbon atoms separate the halogen and oxygen atoms, and each $Q^2$ is independently hydrogen, halogen, primary or secondary lower alkyl, phenyl, haloalkyl, hydrocarbonoxy or halohydrocarbonoxy. Suitable examples of primary lower alkyl groups include methyl, ethyl, n-propyl, n-butyl, isobutyl, n-amyl, isoamyl, 2-methylbutyl, n-hexyl, 2,3-dimethylbutyl, 2-, 3- or 4methylpentyl and heptyl isomers. Suitable examples of secondary lower alkyl groups include isopropyl, sec-butyl and 3-pentyl. Preferably the alkyl radicals are straight chain rather than branched. Most often, each substituent $Q^1$ is alkyl or phenyl, especially $C_{1-4}$ alkyl, and each $Q^2$ is hydrogen. Suitable polyphenylene ethers are well known in the art and described in many patents.

The polyphenylene ether which is used can be a polyphenylene ether homopolymer or copolymer. A suitable homopolymer includes that which is constituted of 2,6-dimethyl-1,4-phenylene ether units. Suitable copolymers include random copolymers containing such units in combination with, for example, 2,3,6-trimethyl-1,4-phenylene ether units. Many suitable random copolymers come as well as homopolymers are also disclosed in the patent literature.

The polyphenylene ether generally has a number average molecular weight within the range of about 3,000–60,000, preferably 3,000–40,000, if the objective besides employing the alkali metal salt of the polyphenylene ether as a nucleating agent, also includes improving the properties of the polymer product obtained. If it is desired to achieve only a nucleating agent effect with the alkali metal salt of the polyphenylene ether, the number average molecular weight of the polyphenylene ether may range from about 1,000 up to 60,000. The weight average molecular weight of the polyphenylene ether ranges from about 20,000 to 120,000 as determined by gel permeation chromatography. If the number average molecular weight is greater than 60,000, the polyphenylene ether is not very processable and may become intractable. At number average molecular weights lower than about 1,000, the product blend itself would likely have a low impact strength, which is particularly observed at polyphenylene ether with a number average molecular weight of about 1,000. At lower molecular weights the heat deflection temperature and the use temperature of the PPE/polyester blend are also decreased. If an attempt is made to employ a polyphenylene ether having a molecular weight below about 1,000, the polyphenylene ether salt will function as a nucleating agent, but the properties of the PET product will begin to deteriorate. The very low molecular weight polyphenylene ether salt will function as a nucleating agent, because it is a sodium salt, with sodium ions functioning as nucleating agents.

The following equation illustrates the preparation of the alkali metal polyphenylene ether salt which functions as a nucleating agent in the present invention.

$$PPE-OH + MOH \rightarrow PPE-O^-M^+$$

Any alkali metal ion (M) can be used in the preparation of the salt, with sodium and lithium being preferred, with lithium most preferred.

A description of polyphenylene ether materials which can be employed in the present invention can be found in U.S. Pat. Nos. 4,940,753 and 4,238,673.

In the formulation of the present invention, at the higher concentrations of polyphenylene ether salt in the thermoplastic polyester, one achieves a state in which essentially polyphenylene ether polymer modifies the thermoplastic polyester. The molding composition of the present invention should contain at least the amount of polyphenylene ether salt which effectively increases the crystallization rate of the thermoplastic polyester. As the amount of polyphenylene ether salt is increased, both the crystallization rate and temperature of the polyester will increase. The amounts of the two components are stated above. It is pointed out that the lower the molecular weight of the polyphenylene ether, the greater the number of OH groups in the polyphenylene ether additive, since such groups are at the termini of the polymers. In the preparation of a molding composition, unmodified polyphenylene ether can be blended into the composition in amounts of up to about 60 percent. The temperature of mixing of polyphenylene ether salt with the thermoplastic polyester preferably ranges from about 280° to 300° C. which is at the melting point of PET. Temperatures much higher than 300° C. can adversely affect the thermoplastic polyester. The blend of ingredients can be made in solution with an appropriate solvent such as THF, toluene or the like of chloroform or DMF.

PET materials made from long chained polyglycols require high temperature processing. 2,6-Naphthylene dicarboxylic acid can be employed as a component of the polyester. A type of polyester which can be employed is branched polyesters prepared from triols or higher polyols with a glycol. The thermoplastic polyester which is to be usked to prepare the composition of the present invention must be dried before processing in order to impart hydrolytic stability to the composition. since polyphenylene ether is hydrophobic, this material need not be dried before combining with the thermoplastic polyester. The particualr types of polyphenylene ether salts and thermoplastic polyester selected for any given composition in the amounts thereof are dependent upon the polyphenylene ether being capable of being incorporated in the continuous phase of the blend. However, it is also possible to have the polyphenylene ether as a discontinuous phase in the composition. In the preparation of the composition, it makes no difference whether the polyphenylene ether is brought into the composition as a salt or in unmodified form. If water is present in the composition, it can result in degradation of the polymer during processing. In fact, hydrolytic stability of the PET is poor and measures should be taken to dry the polyester, since even small amounts of water will adversely affect the molding composition during processing.

The molding compositions of the present invention are suitable for use in the production of molded articles employing conventional molding apparatus. As such the molding composition can optionally contain amounts of up to 50 percent by weight based on the weight of the polyester of additives such as unmodified polyphenylene ether, compatibilizing agents employed for PPE/polyester blends, pigments, fillers, lreinforcing agents, stabilizers, antioxidants, lubricants, plasticizers, impact modifiers and other nucleating agents such as an alkali metal salt of a carboxylic acid.

The process of this invention can be carried out by using any art recognized method of incorporating a nucleating agent into a polyester resin. The PPE salt can be added at any time during the preparation of the molding composition, or the salt can be added to the molding composition while it is molten after it has been fully prepared just prior to molding. For example, the polyester-PPE salt and any other components can be dry blended at room temperature followed by melt mixing using any conventional melt mixing apparatus including extruders, calenders, kneaders and the like at a temperature above the softening point of the polyester, preferably about 200° C.–300° C., most preferably 280° C.–300° C. Also, the polyester and PPE salt and other components can be brought together in a melt compounder and extruded. The compositions can then be pelletized for molding processes.

The molding composition of the present invention can be directly injection molded, melt spun, cast or extruded. The compositions of the present invention are particularly useful in the manufacture of injection molded articles.

Having generally described this invention, a further understanding can be obtained by reference to certain specific examples which are provided herein for purposes of illustration only and are not intended to be limiting unless otherwise specified.

Synthesis of Sodium Salt of PPE

A 0.25 gram quantity of sodium hydroxide and 100 ml of 2-propanol are added to a 2,000 ml 3-necked flask. The flask is continuously purged with nitrogen gas. The flask is heated in a silicone oil bath to 50° C., and the temperature is maintained at this level for about four hours until all of the sodium hydroxide pellets are dissolved. Then 1,000 ml of tetrahydrofuran (THF) and 50 grams of polyphenylene ether (PPE) powder are added to the flask. The temperature of the flask is maintained at 60° C. for 24 hours. The reactants are constantly stirred with a magnetic stirrer during the reaction. After 24 hours, the solution is precipitated using methanol. The white precipitate is filtered and dried in a vacuum oven at 120° C. for 12 hours. The number average molecular weight (Mn) and weight average molecular weight (Mw) for the sodium salt of PPE are 25,600 and 82,000 respectively, as determined by gel permeation chromotography (GPC).

Samples of PET containing various PPE salt nucleating agents are prepared and the induction of crystallinity for each is determined by DSC (cooling) employing a Perkin-Elmer 7 Series Thermal Analysis System. A 10 mg chip sample of a PET molding composition is used in a give DSC analysis. The procedure employed using the DSC is as follows: The sample is heated to 300° C. in the DSC and is kept at that temperature for three minutes to ensure complete melting of the PET polymer in the blend. Then the sample is cooled at 20° C./minute to room temperature. By measuring the temperature at which the induction of crystallinity occurs, as well as the temperature of maximum heat evolution, indication of the temperature at which the crystallization takes place can be readily determined.

Blends of PET and PPE salt are prepared by weight percent formulations as shown in the table below, with a control example being prepared. The PET has an intrinsic viscosity of 0.62 g/dL measured in 60/40 V/V 1,1,2,2-tetrachloroethane/phenol at 25° C. The blend samples including the control PPE/PET blends and PET are prepared in a Haake Rheomixer Blender. The temperature during mixing is 300° C. The screw speed and the residence time in the Haake Rheomixer are 80 rpm and 3.5 minutes, respectively. Thermo analysis of the PET molding composition by DSC is performed as described above. The crystallization temperatures of the PET samples prepared are shown in the table below. The data show that the PPE salt increases the crystallization rate of PET considerably.

TABLE I

CRYSTALLIZATION TEMPERATURES FOR PPE/PET BLENDS

| Blend | Crystallization Temperature |
| --- | --- |
| 90% PET/10% PPE* | 195.3° C. |
| 90% PET/10% Sodium Salt of PPE | 198° C. |
| 50% PET/50% PPE | 193° C. |

TABLE I-continued
CRYSTALLIZATION TEMPERATURES FOR PPE/PET BLENDS

| Blend | Crystallization Temperature |
|---|---|
| 50% PET/50% Sodium Salt of PPE | 205° C. |

*PPE = IV of 0.46 in chloroform at 25° C.

What is claimed as new and is intended to be secured by letters patent:

1. A molding composition comprising a thermoplastic polyester and an alkali metal salt of PPE, as a nucleating agent.

2. The composition of claim 1, wherein said polyester is a poly(alkylene terephthalate) having repeating units of the formula:

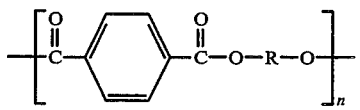

wherein n is an integer ranging from 2 to 6.

3. The composition of claim 2, wherein said poly(alkylene terephthalate) is polyethylene terephthlate.

4. The composition of claim 1, wherein said alkali metal of said salt of PPE is sodium or lithium.

5. The composition of claim 1, wherein the number average molecular weight of the alkali metal salt of PPE ranges from 1,000 to about 60,000.

6. The composition of claim 5, wherein said number average molecular weight ranges from 3,000 to 40,000.

7. The composition of claim 1, wherein the weight average molecular weight of said alkali metal salt of PPE ranges from about 20,000 to 120,000.

8. The composition of claim 1, which comprises 10–90 percent by weight polyester and 10–90 percent by weight of alkali metal salt of PPE.

9. The composition of claim 1, wherein said polyphenylene ether of said alkali metal salt comprises a plurality of units of the formula:

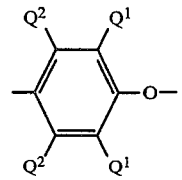

wherein each $Q^1$ is independently halogen, primary or secondary lower alkyl, phenyl, haloalkyl, aminoalkyl, hydrocarbonoxy or halohydrocarbonoxy wherein at least two atoms separate the halogen and oxygen atoms, and each $Q^2$ independently is hydrogen, halogen, primary or secondary lower alkyl, phenyl, haloalkyl, hydrocarbonoxy or halohydrocarbonoxy.

10. The composition of claim 1, wherein said polyphenylene ether of said alkali metal salt is a homopolymer of 2,6-dimethyl-1,4-phenylene ether.

11. The composition of claim 1, wherein said composition further comprises at least one additive selected from the group consisting of unmodified polyphenylene ether, compatibilizing agents, pigments, fillers, reinforcing agents, stabilizers, antioxidants, lubricants, plasticizers, impact modifiers and other nucleating agents.

12. The composition of claim 2, wherein said polyalkylene terephthalate is PET.

13. The composition of claim 1, wherein said thermoplastic polyester is formed by the reaction of at least one dicarboxylate acid of which at least 20 percent is an aromatic dicarboxylate acid selected from the group consisting of terephthalate acid, isophthalic acid, naphthalene dicarboxylate acid, diphenyl ether dicarboxylic acid, diphenyl dicarboxylate acid, diphenyl sulfone dicarboxylate acid and diphenoxyethane dicarboxylic acid with at least one diol selected from the group of aliphatic diols containing from 2 to 10 carbon atoms.

14. A method of achieving crystallization of a thermoplastic polyester upon molding, which comprises:
molding a thermoplastic composition which contains an alkali metal salt of polyphenylene ether as a nucleating agent.

* * * * *